(12) United States Patent
Hackenberg et al.

(10) Patent No.: US 11,203,406 B2
(45) Date of Patent: Dec. 21, 2021

(54) MOUNTING SYSTEM FOR A PRESSURE SEAL OF AN AIRCRAFT DOOR

(71) Applicant: AIRBUS HELICOPTERS DEUTSCHLAND GMBH, Donauworth (DE)

(72) Inventors: Thomas Hackenberg, Niederschoenenfeld Ot Feldheim (DE); Thomas Thiess, Harburg-Ebermergen (DE); Dirk Trott, Hoerselgau (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 371 days.

(21) Appl. No.: 16/507,303

(22) Filed: Jul. 10, 2019

(65) Prior Publication Data
US 2020/0062371 A1 Feb. 27, 2020

(30) Foreign Application Priority Data
Aug. 27, 2018 (EP) .................................... 18400027

(51) Int. Cl.
*B64C 1/14* (2006.01)
*E06B 7/23* (2006.01)

(52) U.S. Cl.
CPC .......... *B64C 1/1461* (2013.01); *E06B 7/2305* (2013.01)

(58) Field of Classification Search
CPC . B64C 1/14; B64C 1/1461; B64F 5/10; E06B 7/2305; E06B 7/2303; E06B 7/22
See application file for complete search history.

(56) References Cited

U.S. PATENT DOCUMENTS

| | | | | |
|---|---|---|---|---|
| 2,530,160 A | * | 11/1950 | Finley | E06B 7/2318 49/477.1 |
| 2,560,665 A | * | 7/1951 | Stark | B64C 1/14 49/477.1 |
| 2,686,343 A | * | 8/1954 | Swanson | B64C 1/1423 49/477.1 |

(Continued)

FOREIGN PATENT DOCUMENTS

FR 2944332 A1 10/2010

OTHER PUBLICATIONS

European Search Report for European Application No. EP 18400027, Completed by the European Patent Office, dated Feb. 18, 2019, 11 pages.

*Primary Examiner* — Medhat Badawi
(74) *Attorney, Agent, or Firm* — Brooks Kushman P.C.

(57) ABSTRACT

An aircraft door, and, more particularly, to a mounting system for a pressure seal of an aircraft door. A mounting system may include an outer skin, a pressure seal, a clamping component, a pressure seal fastener having a head and a threaded shank, a nut, a mounting support having a clearance hole that is adapted to prevent a rotational and axial movement of the pressure seal fastener, and mounting support fasteners. Mounting support fasteners removably attach the mounting support to the outer skin. The head of the pressure seal fastener is connected to the mounting support such that a rotational and axial movement of the pressure seal fastener is prevented. The nut is removably attached to the threaded shank of the pressure seal fastener, thereby removably clamping the pressure seal between the clamping component and the mounting support.

12 Claims, 5 Drawing Sheets

(56) References Cited

U.S. PATENT DOCUMENTS

| | | | | |
|---|---|---|---|---|
| 2,910,209 | A | * | 10/1959 | Nelson ................. A61G 17/036 220/378 |
| 2,969,252 | A | * | 1/1961 | Gruver .................... E06B 7/23 277/642 |
| 3,037,251 | A | * | 6/1962 | Landis ................. E06B 7/2309 49/476.1 |
| 3,085,297 | A | * | 4/1963 | Linderfelt .............. B64C 1/143 49/248 |
| 3,178,779 | A | * | 4/1965 | Clark ..................... F16J 15/46 277/646 |
| 3,226,780 | A | * | 1/1966 | Landis ................. E06B 7/2309 49/368 |
| 3,371,445 | A | * | 3/1968 | Herr ..................... E06B 7/2309 49/368 |
| 3,763,595 | A | * | 10/1973 | Sudyk ................. E06B 7/2309 49/489.1 |
| 3,791,075 | A | * | 2/1974 | Blickman ............ E06B 7/2318 49/484.1 |
| 3,831,950 | A | * | 8/1974 | Bentley ............... F16J 15/3236 277/649 |
| 4,010,573 | A | * | 3/1977 | Andrzejewski ......... B60J 10/24 49/479.1 |
| 4,255,903 | A | * | 3/1981 | Reynolds ............. E06B 7/2318 49/479.1 |
| 4,312,153 | A | * | 1/1982 | Parkinson ............... E06B 7/231 244/129.5 |
| 4,337,956 | A | * | 7/1982 | Hopper ................ F16J 15/3232 277/552 |
| 4,552,326 | A | * | 11/1985 | Bokalot .................. B64C 1/143 244/129.5 |
| 4,987,705 | A | * | 1/1991 | Sampson ................ E04D 13/03 49/483.1 |
| 5,581,951 | A | * | 12/1996 | Ryan ................... E06B 7/2309 49/489.1 |
| 5,667,169 | A | * | 9/1997 | Erben .................. B64C 1/1407 244/129.4 |
| 6,116,615 | A | * | 9/2000 | Trehan ................. H05K 9/0015 174/358 |
| 6,401,398 | B1 | * | 6/2002 | Panayides ................ B64C 1/14 49/498.1 |
| 6,736,921 | B1 | * | 5/2004 | Saward ................ B23P 19/047 156/244.22 |
| 6,796,528 | B2 | * | 9/2004 | Wood .................. B64C 1/1476 244/121 |
| 6,966,590 | B1 | * | 11/2005 | Ksiezopolki ............. B60P 3/34 296/26.01 |
| 7,487,616 | B2 | * | 2/2009 | Deaver ................. F16J 15/027 49/498.1 |
| 7,614,676 | B2 | * | 11/2009 | Ksiezopolski ........... B60P 3/34 296/26.09 |
| 7,614,677 | B2 | * | 11/2009 | Ksiezopolski ........... B60P 3/34 296/26.09 |
| 7,788,852 | B2 | * | 9/2010 | Wexler ................. E06B 7/2309 49/482.1 |
| 8,091,831 | B2 | * | 1/2012 | Roming .................... B64C 1/14 244/129.5 |
| 8,511,610 | B2 | * | 8/2013 | Depeige ................... B64C 1/14 244/129.5 |
| 8,701,351 | B2 | * | 4/2014 | Siegel ..................... B60P 3/34 49/490.1 |
| 8,740,148 | B2 | * | 6/2014 | Risch ..................... B64C 1/14 244/129.5 |
| 8,875,443 | B2 | * | 11/2014 | Siegel ..................... B60P 3/32 49/462 |
| 8,910,422 | B2 | * | 12/2014 | Siegel ..................... B60P 3/32 49/490.1 |
| 9,169,929 | B2 | * | 10/2015 | Kellar .................. F16J 15/3204 |
| 9,340,291 | B2 | * | 5/2016 | Nestel ..................... B64D 11/00 |
| 9,517,830 | B2 | * | 12/2016 | Hariram ............... F16J 15/121 |
| 10,683,698 | B2 | * | 6/2020 | Dintheer ............... E06B 7/2309 |
| 10,875,622 | B2 | * | 12/2020 | Lavallee ................ B64C 1/143 |
| 2003/0146347 | A1 | * | 8/2003 | Roessner ........... B64D 45/0028 244/129.5 |
| 2009/0113954 | A1 | * | 5/2009 | De Resseguier ...... E05C 19/002 70/91 |
| 2012/0248713 | A1 | * | 10/2012 | Raspic .................. B60J 10/365 277/630 |
| 2014/0049067 | A1 | * | 2/2014 | Kasuya ................... B60J 10/86 296/146.5 |
| 2014/0103163 | A1 | * | 4/2014 | Lamat .................. B64C 1/1461 244/129.5 |
| 2014/0223829 | A1 | * | 8/2014 | Korenaga ............. B64C 1/1461 49/483.1 |
| 2014/0260009 | A1 | * | 9/2014 | Ball ....................... A47K 3/284 52/207 |
| 2014/0345199 | A1 | * | 11/2014 | Yahata ..................... B64C 1/14 49/475.1 |
| 2015/0064389 | A1 | * | 3/2015 | Zahlen ................... B32B 3/266 428/76 |
| 2015/0314436 | A1 | * | 11/2015 | Reid ...................... B25J 11/005 414/800 |
| 2015/0344122 | A1 | * | 12/2015 | Paul ..................... E06B 7/2303 244/129.5 |
| 2016/0304205 | A1 | * | 10/2016 | Hussain ............. B64D 11/0601 |
| 2017/0037672 | A1 | * | 2/2017 | Haynes ................... E06B 7/14 |
| 2018/0057142 | A1 | * | 3/2018 | Wilkerson ............ B64D 45/02 |
| 2020/0062371 | A1 | * | 2/2020 | Hackenberg .............. B64F 5/10 |
| 2020/0130806 | A1 | * | 4/2020 | Heeren ................ B64C 1/1461 |

* cited by examiner

MOUNTING SYSTEM FOR A PRESSURE SEAL OF AN AIRCRAFT DOOR

CROSS-REFERENCE TO RELATED APPLICATIONS

This application claims priority to European patent application No. EP 18400027.1 filed on Aug. 27, 2018, the disclosure of which is incorporated in its entirety by reference herein.

BACKGROUND OF THE INVENTION

(1) Field of the Invention

The invention is related to an aircraft door, and, more particularly, to a mounting system for a pressure seal of an aircraft door.

(2) Description of Related Art

In general, aircraft doors fulfill the following major functions: They provide access for passengers and crew members to an aircraft cabin of an aircraft and allow evacuation of the aircraft cabin in case of an emergency. Additionally, the aircraft doors also carry, unfold, and inflate slides used to evacuate the passengers from the aircraft in case of an emergency. Thus, aircraft doors must generally fulfill predefined airworthiness requirements in order to allow for a safe, secure and reliable operation of respective aircrafts. Such airworthiness requirements are defined in applicable safety regulations and specifications, such as the US-American Federal Aviation Regulations (FAR) and/or the European Certification Specifications (CS) from the European Aviation Safety Agency (EASA).

According to these airworthiness requirements, the aircraft doors of a given aircraft must be tightly locked in an associated closed state during operation of the given aircraft. The aircraft doors must further be capable of taking up all loads to which they may be exposed during operation of the given aircraft in the closed state. Furthermore, if the given aircraft is equipped with a pressurized cabin, the aircraft doors must additionally be capable of withstanding a respective internal cabin pressure during flight.

For this purpose, an aircraft door is equipped with a pressure seal that includes a pressure seal bulb and a pressure seal foot. The pressure seal is usually attached to the aircraft door with a clamp that clamps the pressure seal foot to the aircraft door. The clamping includes a stack of material that includes beginning from the outer fuselage: a screw, the outer skin, an edge protection, the pressure seal foot, an inner retainer, and a nut.

The document US 2015/0344122 A1 describes an aircraft door that includes an outer shell with an exterior and an interior, a stiffening structure arranged on the interior of the outer shell, and at least one door seal arranged on the interior of the outer shell. The door seal is circumferential in an edge region. In the edge region between the outer shell and the door seal at least one circumferential stiffening component is arranged that is connected to the stiffening structure.

Thus, the description of the door seal in document US 2015/0344122 A1 is basically limited to its relationship with the stiffening structure. However, the possibility of a simple exchange of the door seal is not described. To the contrary, a rivet connection is used to fix the holding plate of the door seal to the outer skin as shown in FIG. 3, which prevents an easy exchange of the door seal.

The document FR 2944332 describes an assembly that has an intermediate part i.e. a plate, fixed on a support by a sealing joint, where the intermediate part is made of composite material. The intermediate part comprises a through hole i.e. U notch, for passage of a stem of a screw and a blocking unit for blocking the rotation of a head of the screw. The through hole is surrounded by a groove which is opened on a lower face of the intermediate part. A fixing part is placed between the sealing joint and a nut of a bolt.

However, the intermediate part according to document FR 2944332 is joined to the skin of the support, i.e. the airplane door by bonding with an epoxy resin. Even though the sealing mounting concept seems to allow an exchange of the sealing joint during maintenance, it does not seem to allow an easy replacement of the intermediate part and/or the screw in case of damage to the intermediate part and/or the screw.

Thus, in summary, today's mounting systems for pressure seals of aircraft doors often require a high maintenance effort, e.g. to replace parts of the mounting system such as the pressure seal or the pressure seal fastener. Some mounting systems even involve the destruction and reconstruction of some of the components of the mounting system during maintenance, e.g. scraping of the intermediate part from the airplane door that was bonded to the latter with an epoxy resin.

Furthermore, since the mounting system often involves numerous parts that are arranged in a stack, and since a high number of parts automatically lead to an accumulation of tolerances, a standardization towards a lower number of fasteners having few different lengths becomes difficult. The problem is further exacerbated by the flexibility of the pressure seal foot under compression and the difficult predictable final thickness in installed condition.

A related problem is the nominal thickness of the parts inside the stack. A stress and weight optimized structural part geometry often involves a variable part thickness. This thickness change in nominal design leads to a change in the length code of the required fasteners. These tolerances increase the influence of the nominal stack thickness when the nominal fastener length is designed on the border of the standard screw length validity resulting in a continuous change of fastener lengths, which in turn results in a time and cost intensive mounting process.

BRIEF SUMMARY OF THE INVENTION

It is, therefore, an objective to provide a new apparatus for mounting a pressure seal of an aircraft that involves a stack, which allows for an easy replacement of parts during maintenance.

This objective is solved by an apparatus for mounting a pressure seal of an aircraft door of an aircraft and comprises the features of claim 1. More specifically, a mounting system for a pressure seal of an aircraft door of an aircraft includes an outer skin of the aircraft door, a pressure seal, a clamping component, a pressure seal fastener having a head and an at least partially threaded shank, a nut, a mounting support having at least one clearance hole, wherein the clearance hole is adapted to prevent a rotational movement of the pressure seal fastener, and at least two mounting support fasteners. The at least two mounting support fasteners removably attach the mounting support to the outer skin. The head of the pressure seal fastener is connected to the mounting support such that a rotational and axial movement of the pressure seal fastener is prevented, and the nut is removably attached to the at least partially threaded shank of the pressure seal fastener, thereby removably clamping the pressure seal between the clamping component and the mounting support.

The head of the pressure seal fastener is preferably connected to the mounting support by means of an associated feature, such as e. g. clinching. The pressure seal fastener which is preferably used for clamping the pressure seal foot to the aircraft door structure interface is implemented into the mounting system. The mounting system itself is mounted via removable fasteners to the door structure and creates the pressure seal contact interface. The rotation blocking feature of the fastener is provided either in the mating surface to the mounting support or/and in the generated surface of the cut out/pocket.

As a result, a constant fastener length can be used to clamp the pressure seal to the door structure. Thus, the mounting system can be predefined by the design authority in the stage of a sub-assembly.

Due to the stable and controllable clamping stack, time and cost may be reduced in the assembly stage, in which the pressure seal is mounted to the door structure. Time and cost may be further reduced during the mounting support installation on the door structure due to the removal of the pressure seal and the inner retainer from the clamping stack.

Moreover, the mounting support may be replaced in case of damage to the fastener by loosening the fastener connection of the mounting support to the door structure.

The mounting system further enables a single-sided exchange of the pressure seal from the door structure. Due to the rotation locking system in the mounting support a manual rotation blocking via screw head recess is not necessary. Thus, the outer skin (i.e., fuselage) of the aircraft door remains intact in case of repair and/or exchange of the pressure seal, and thereby a reduction in cost and time can be achieved.

According to one aspect, the mounting support has an edge protection that at least partially encompasses an edge of the outer skin.

According to one aspect, the head of the pressure seal fastener fits inside the clearance hole of the mounting support and the at least partially threaded shank of the pressure seal fastener protrudes from the mounting support through the clearance hole.

According to one aspect, the mounting support is at least partially made from a fiber reinforced composite material.

According to one aspect, the pressure seal further includes a pressure seal bulb and a pressure seal foot that is clamped between the clamping component and the mounting support.

According to one aspect, the pressure seal foot further includes a first cut-out for the at least partially threaded shank of the pressure seal fastener and at least second and third cut-outs for the at least two mounting support fasteners.

According to one aspect, the clamping component further includes at least two openings for the at least two mounting support fasteners, wherein a respective opening of the at least two openings provides access to a respective mounting support fastener of the at least two mounting support fasteners.

According to one aspect, at least two mounting support fasteners through the at least two openings enable a detachment of the outer skin from the mounting support without releasing the pressure seal from between the clamping component and the mounting support.

According to one aspect, the pressure seal bulb further includes a venting hole that ensures that a first pressure inside the pressure seal bulb and a second pressure outside the pressure seal bulb at the opening of the venting hole are substantially the same.

According to one aspect, each of the at least two mounting support fasteners further include a sunken head that does not protrude from the outer skin.

Furthermore, a method for using a mounting system to install a pressure seal of an aircraft door of an aircraft, may include the operations of receiving the mounting system, wherein the mounting system comprises an outer skin of the aircraft door, a pressure seal, a clamping component, a pressure seal fastener having a head and an at least partially threaded shank, a nut, a mounting support having at least one clearance hole, wherein the clearance hole is adapted to prevent a rotational movement of the pressure seal fastener, and at least two mounting support fasteners, using the at least two mounting support fasteners to removably attach the mounting support to the outer skin, connecting the head of the pressure seal fastener to the mounting support such that a rotational and axial movement of the pressure seal fastener is prevented, and removably attaching the nut to the at least partially threaded shank of the pressure seal fastener, thereby removably clamping the pressure seal between the clamping component and the mounting support.

Connecting the head of the pressure seal fastener to the mounting support is preferably performed by means of a suitable feature, such as e. g. clinching.

According to one aspect, using the at least two mounting support fasteners to removably attach the mounting support to the outer skin further includes inserting the head of the pressure seal fastener inside the clearance hole of the mounting support such that the at least partially threaded shank of the pressure seal fastener protrudes from the mounting support through the clearance hole.

According to one aspect, each of the at least two mounting support fasteners has a sunken head, and using the at least two mounting support fasteners to removably attach the mounting support to the outer skin further includes fastening each of the at least two mounting support fasteners such that the sunken head of the respective mounting support fastener does not protrude from the outer skin.

According to one aspect, the pressure seal has a first cut-out and at least second and third cut-outs, and removably attaching the nut to the at least partially threaded shank of the pressure seal fastener further includes aligning the first cut-out with the at least partially threaded shank of the pressure seal fastener, and aligning the at least second and third cut-outs with the at least two mounting support fasteners.

According to one aspect, the clamping component has a hole and at least two openings, and removably attaching the nut to the at least partially threaded shank of the pressure seal fastener further includes aligning the hole with the at least partially threaded shank of the pressure seal fastener, and aligning each of the at least two openings with a respective mounting support fastener of the at least two mounting support fasteners.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
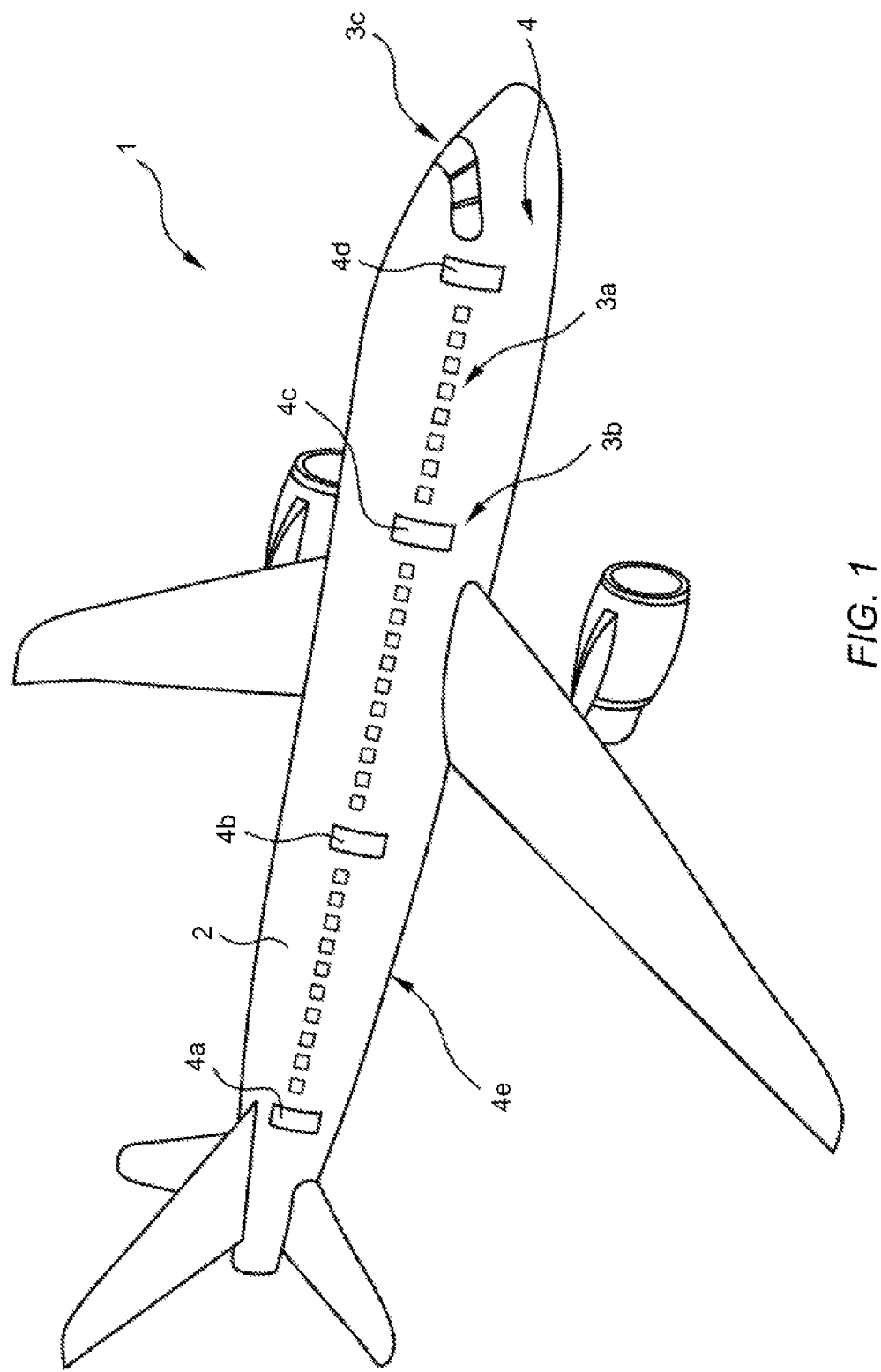
FIG. 1 is a diagram of an illustrative aircraft in accordance with some embodiments.

FIG. 1 shows an aircraft 1 with an aircraft airframe 2. The aircraft 1 illustratively comprises a passenger cabin 3a, a cargo deck 3b and a flight deck or cockpit 3c. In some embodiments, the aircraft 1 is accessible via aircraft doors 4, which exemplarily comprise several cabin access doors 4a, 4b, 4c and 4d, as well as one or more cargo deck access doors 4e. By way of example, the passenger cabin 3a and the flight deck 3c are accessible via the cabin access doors 4a, 4b, 4c and 4d, and the cargo deck 3b is accessible via the one or more cargo deck access doors 4e.

The aircraft doors 4 are adapted to close the aircraft airframe 2 of the aircraft 1. The aircraft doors 4 generally comprise a door structure, which can be implemented by a plurality of frames arranged between an inner and an outer door skin, if desired. However, the basic construction of aircraft doors 4 as such is well known to the person skilled in the art. Therefore, the basic construction is not described in more detail hereinafter, for brevity and conciseness.

In some embodiments, aircraft doors 4 may be equipped with a pressure seal. Illustratively, aircraft 1 may be an airplane. However, any vehicle that may be equipped with doors having a pressure seal is likewise contemplated. By way of example, embodiments of doors with pressure seals may alternatively be applied to spacecraft, motor vehicles, vessels, or other aircrafts such as drones, helicopters, multicopters, just to name a few.

Figure 2:
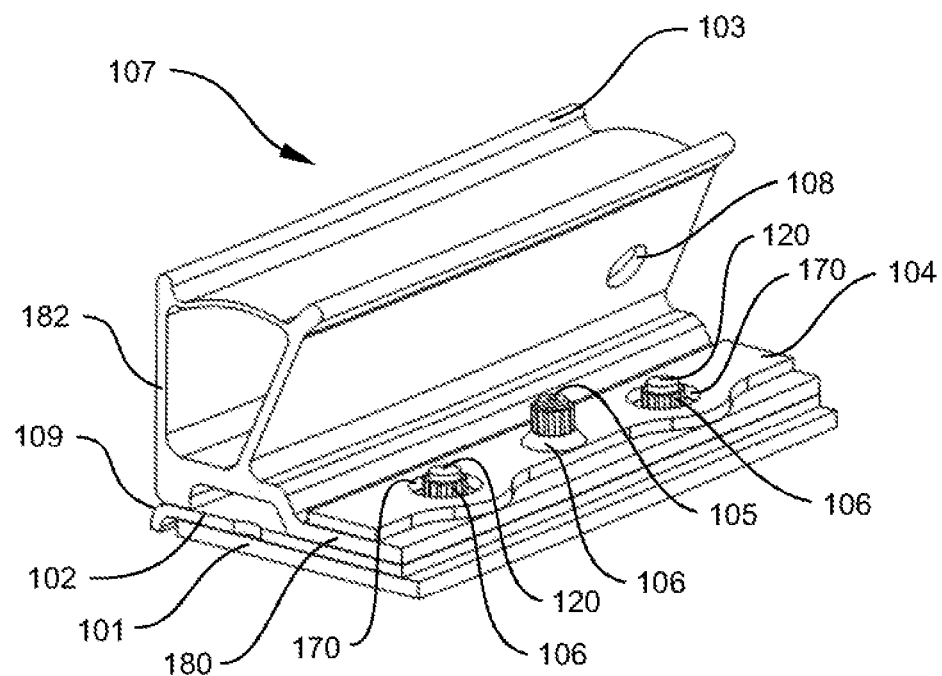
FIG. 2 is a diagram of an illustrative mounting system for a pressure seal of an aircraft door in accordance with some embodiments.

In some embodiments, a pressure seal installed at aircraft doors 4 may ensure that aircraft airframe 2 withstands a differential pressure between the inside and the outside of aircraft airframe 2. A mounting system for a pressure seal may include a predetermined stack of components. FIG. 2 is a diagram of an illustrative mounting system for a pressure seal of an aircraft door in accordance with some embodiments.

As shown in FIG. 2, mounting system 107 may include outer skin 101, mounting support 102, pressure seal 103, clamping component 104, pressure seal fastener 105, mounting support fasteners 120, and nuts 106. In some embodiments, pressure seal fastener 105 may have a head and an at least partially threaded shank to which nut 106 may be fastened.

Illustratively, mounting system 107 is shown to have one pressure seal fastener 105 and two mounting support fasteners 120. However, mounting system 107 may have an arbitrary number of pressure seal fasteners 105 and/or an arbitrary number of mounting support fasteners 120. For example, pressure seal 103 may extend around the circumference of an aircraft door such as aircraft doors 4 of FIG. 1, and pressure seal fasteners 105 and mounting support fasteners 120 may be distributed around the circumference of the aircraft door. If desired, pressure seal fasteners 105 and/or mounting support fasteners 120 may be distributed at equal distances from each.

Mounting support fasteners 120 may removably attach mounting support 102 to outer skin 101. If desired, mounting support 102 may have an edge protection that at least partially encompasses outer skin 101. Mounting support 102 may have clearance hole 160. Clearance hole 160 may be adapted to prevent a rotational movement of pressure seal fastener 105.

In some embodiments, the head of the pressure seal fastener 105 is connected to the mounting support 102, e. g. by means of an associated feature such as clinching, such that a rotational and axial movement of the pressure seal fastener 105 is prevented. Nut 106 may be removably attached to the at least partially threaded shank of pressure seal fastener 105, thereby removably clamping pressure seal 103 between clamping component 104 and mounting support 102.

In some embodiments, pressure seal 103 may include pressure seal foot 180 and pressure seal bulb 182. Pressure seal foot 180 may be clamped between clamping component 104 and mounting support 102. In some embodiments, pressure seal bulb 182 may have venting hole 108. Venting hole 108 may insure that the pressure inside pressure seal bulb 182 is the same as outside pressure seal bulb 182 and inside airframe 2 of aircraft 1.

As an example, consider the scenario in which pressure seal 103 is exchanged during maintenance. In this scenario, a removal of nut 106 from partially threaded shank of pressure seal fastener 105 may allow to remove clamping component 104, thereby freeing pressure seal 103. Thus, pressure seal 103 may be removed, a new pressure seal installed, and clamping component 104 fastened to pressure seal foot 180 using nut 106 by threading nut 106 on partially threaded shank of pressure seal fastener 105.

Figure 3:
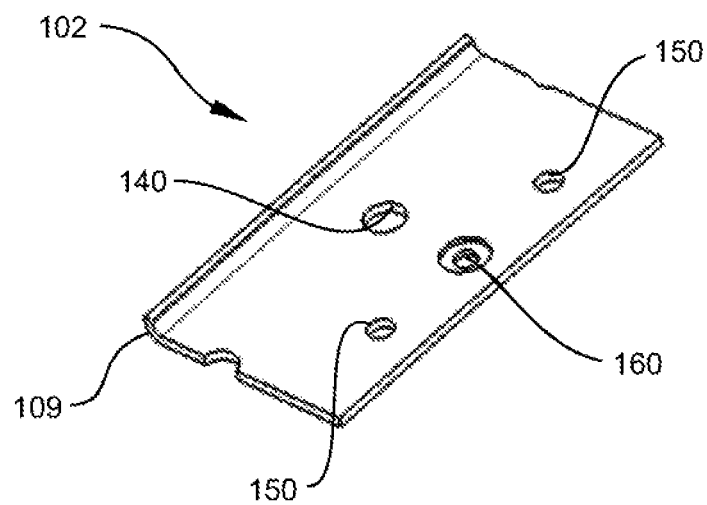
FIG. 3 is a diagram of an illustrative mounting support with boreholes shown from the side that is oriented towards the outer skin in accordance with some embodiments.

FIG. 3 is a diagram of illustrative mounting support 102 with boreholes shown from the side that is oriented towards outer skin 101 in accordance with some embodiments. If desired, mounting support 102 may have edge protection 109 to protect the contour of outer skin 100 of FIG. 1.

Mounting support 102 may be made from any material that is appropriate as a mounting support. For example, mounting support 102 may be made from metal such as steel, aluminum, or any other appropriate metal. If desired, mounting support 102 may be made from a composite material, such as a reinforced plastic composite material.

If desired, mounting support 102 may have different boreholes. As shown, mounting support 102 may have holes 140, 150, and 160. As shown, hole 140 may have a relative high ratio of diameter compared to the diameter of the fastener that attaches mounting support 102 to the outer skin. Thus, holes 140 may be used for clamping mounting support 102 to the outer skin without any positioning function.

As shown, holes 150 may have a relative low diameter ratio compared to the fastener diameter. Thus, holes 150 may be used for mounting of mounting support 102 to an outer skin while providing a more exact positioning and mounting of mounting support 102 relative to the contour of the outer skin.

Hole 160, which is sometimes also referred to as clearance hole 160, is designed in order to retain the head of a pressure seal fastener when clamping a pressure seal foot with a clamping component to mounting support 102. Clamping hole 160 may be split in two diameters, if desired. As an example, a first diameter may have the size and depth of the head of the pressure seal fastener. Thus, the head of the pressure seal fastener may be retained in order to provide a locking against rotation and axial movement.

Figure 4:
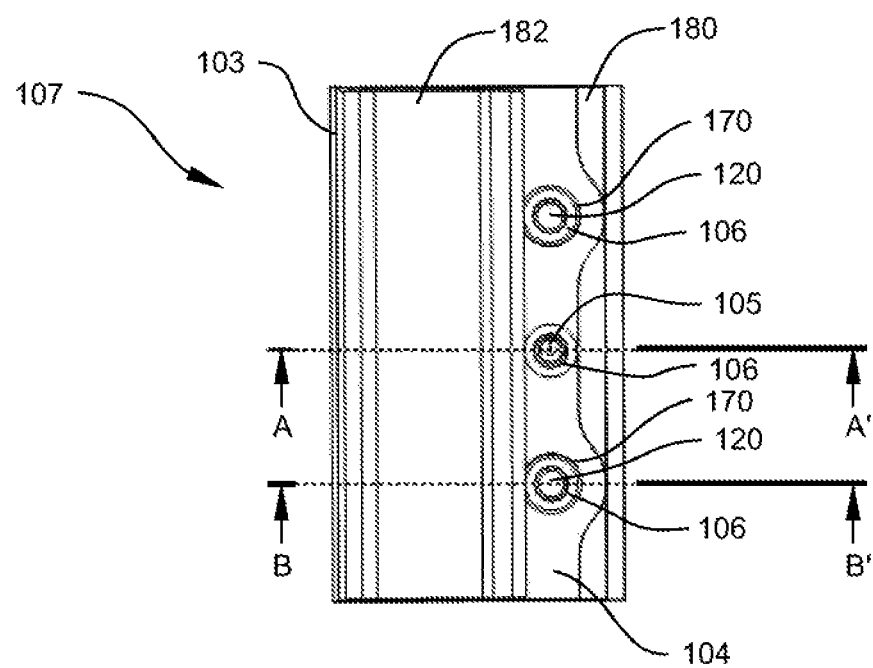
FIG. 4 is a diagram of an illustrative mounting system for a pressure seal of an aircraft shown from above the pressure seal in accordance with some embodiments.

FIG. 4 shows an illustrative mounting system 107 for a pressure seal 103 of an aircraft shown from above pressure seal 103.

As shown in FIG. 4, mounting system 107 may include pressure seal 103 with pressure seal bulb 182 and pressure seal foot 180. Pressure seal foot 180 may be clamped between clamping component 104 and a mounting support. Mounting support fasteners 120 together with nuts 106 may removably attach the mounting support to an outer skin.

Figure 5:
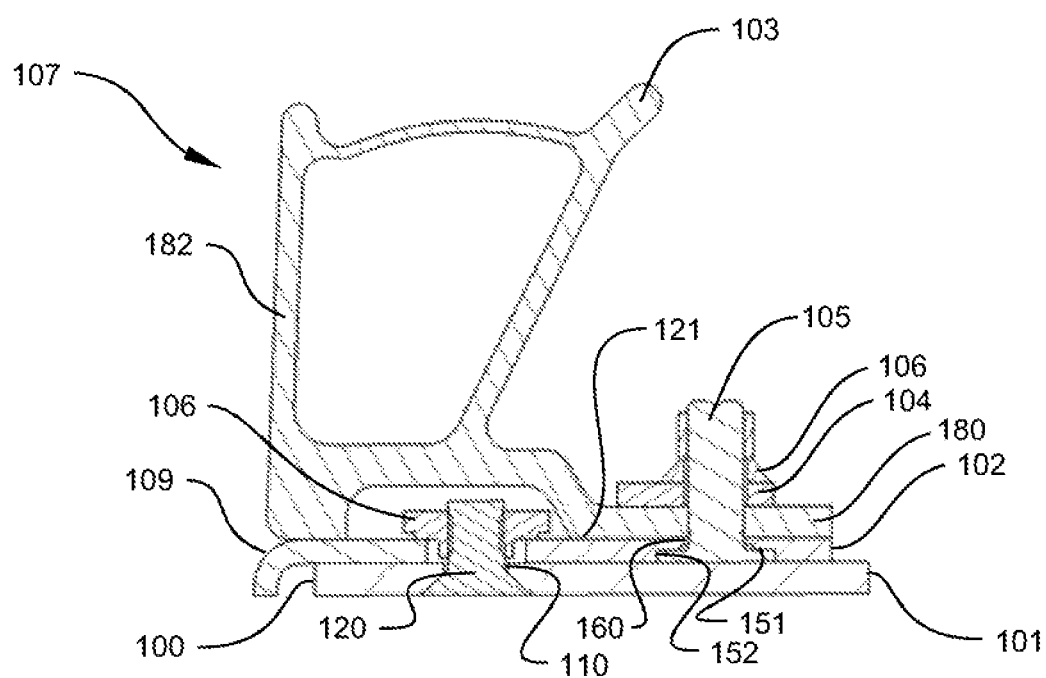
FIG. 5 is a diagram of a cross section at a clearance hole of an illustrative mounting system for a pressure seal of an aircraft in accordance with some embodiments.

A cross-section of mounting system 107 at line A, A' is shown in FIG. 5. A cross-section of mounting system 107 at line B, B' is shown in FIG. 6.

Figure 6:
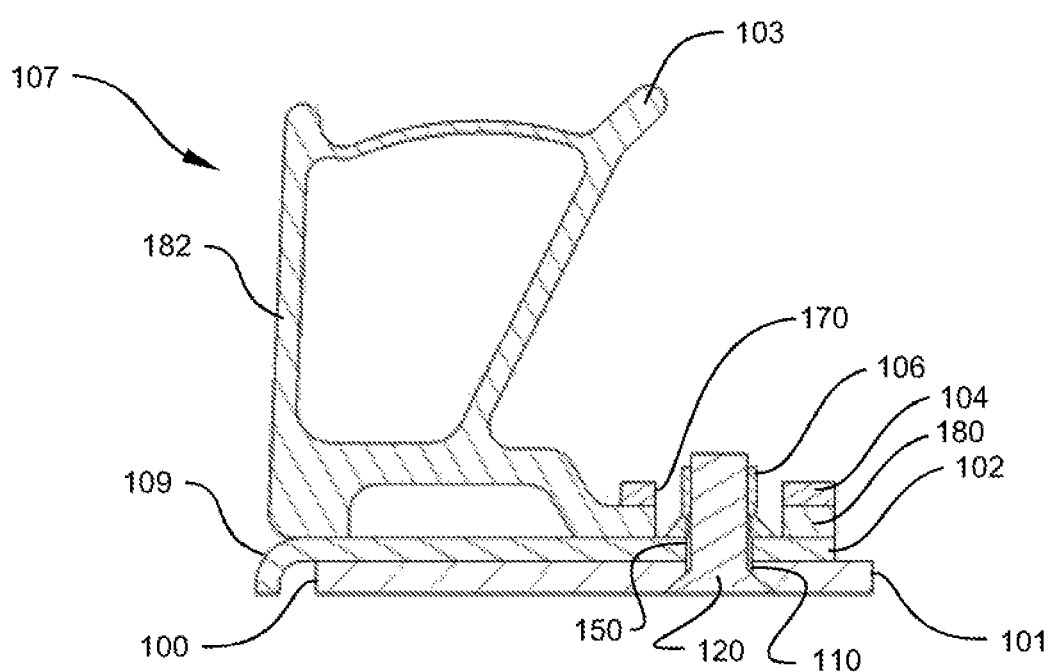
FIG. 6 is a diagram of a cross section at a mounting support fastener of an illustrative mounting system for a pressure seal of an aircraft in accordance with some embodiments.

As shown in FIGS. 5 and 6, mounting system 107 for pressure seal 103 of an aircraft door may include outer skin 101, mounting support 102, and pressure seal 103. Pressure seal 103 may include pressure seal foot 180 and pressure seal bulb 182. Pressure seal foot 180 may be clamped between clamping component 104 and mounting support 102.

Mounting support 102 may be made from any appropriate material. For example, mounting support 102 may be made from a metal such as aluminum, steel or any other appropriate metal. As another example, mounting support 102 may be made from a composite material, such as fiber reinforced plastics.

In some embodiments, mounting support 102 may have edge protection 109. Edge protection 109 may at least partially encompass contour 100 of outer skin 101.

As shown in FIG. 5, mounting support fastener 120 together with nut 106 may fasten mounting support 102 to outer skin 101. Mounting support fastener 120 may fit through hole 110 in outer skin 101. If desired, mounting support fastener 120 may have a sunken head that does not protrude from outer skin 101.

In some embodiments, pressure seal foot 180 of pressure seal 103 may be held in place by pressure seal fastener 105 together with nut 106. Pressure seal fastener 105 and nut 106 may together clamp pressure seal foot 180 between clamping component 104 and mounting support 102.

Consider the scenario in which pressure seal 103 needs to be replaced. As an example, pressure seal 103 may be replaced according to a predetermined maintenance schedule. In this scenario, nut 106 may be removed from pressure seal fastener 105, thereby unlocking clamping component 104 and pressure seal foot 180 of pressure seal 103, which can then both be removed from pressure seal fastener 105.

Installation of a new pressure seal may include the same steps in reverse order. For example, holes in the new pressure seal 103 may be aligned with pressure seal fasteners 105

Mounting support 102 may have clearance hole 160 as shown in FIG. 3. Pressure seal fastener 105 may fit inside clearance hole 160 of mounting support 102. The at last partially threaded shank of pressure seal fastener 105 may protrude from mounting support 102 through clearance hole 160.

The head of pressure seal fastener 105 may be connected to the mounting support 102 such that an axial and rotational movement of the pressure seal fastener 105 is prevented. The connection is preferably realized by means of an associated feature, such as e. g. clinching. For example, the rotational and axial movement of pressure seal fastener 105 may be prevented by mating surface of clearance hole 151.

As another example, the rotational movement of pressure seal fastener 105 may be prevented by using side wall surface 152 of clearance hole 160. If desired, the rotational movement of pressure seal fastener 105 may be prevented by using both mating surface 151 and side wall surface 152 of clearance hole 160.

In the event in which pressure seal fastener 105 is prevented from rotating, nut 106 may be unscrewed from the at least partially threaded shank of pressure seal fastener 105. After removal of nut 106 from pressure seal fastener 105, clamping component 104 may be removed and, thus, pressure seal 103 may be removed from mounting system 107.

In some embodiments, pressure seal foot 180 may include a cut-out for the at least partially threaded shank of pressure seal fastener 105 and/or additional cut-outs for the at least two mounting support fasteners 120. A new pressure seal 103 may be installed on mounting system 107 by fitting the cut-outs for the at least partially threaded shank of pressure seal fastener 105 and the cut-outs for the at least two mounting support fasteners 120 with the corresponding partially threaded shank of pressure seal fastener 105 and the at least two mounting support fasteners 120.

Clamping component 104 may be installed over pressure seal foot 180 by aligning the openings for fastener 170 with the corresponding holes in clamping component 104 such that pressure seal foot 180 is located between clamping component 104 and mounting support 102. Nut 106 may be fastened on top of clamping component 104 thereby clamping pressure seal foot 180 between clamping component 104 and mounting support 102.

FIG. 6 shows mounting system 107 at line B, B' of FIG. 4. As shown in FIG. 6, mounting support fastener 120 may fit through hole 110 in outer skin 101 and hole 150 in mounting support 102. In some embodiments, mounting support fastener 120 may have a sunken head that does not protrude from outer skin 101. Nut 106 that is screwed onto mounting support fastener 120 may, together with mounting support fastener 120, removably attach mounting support 102 to outer skin 101.

In some embodiments, pressure seal foot 180 of pressure seal 103 may include a cut-out for mounting support fastener 120. If desired, nut 106 may fit through an opening for fastener 170 in pressure seal foot 180 of pressure seal 103 and through a hole in clamping component 104. Thus, mounting support fastener 120 and nut 106 do not fasten pressure seal 103 to mounting support 102. Therefore, pressure seal 103 may be exchanged without removing nut 106 from mounting support fastener 120.

In some embodiments, clamping component 104 may include opening 170 for mounting support fastener 120. Opening 170 may provide access to nut 106 that is screwed onto mounting support fastener 120. If desired, nut 106 may be unscrewed from mounting support fastener 120 through opening 170. Thus, opening 170 may enable a detachment of outer skin 101 from mounting support 102 without releasing pressure seal 103 from between clamping component 104 and mounting support 102.

Consider the scenario in which pressure seal fastener 105 of FIG. 5 is damaged and needs to be replaced. In this scenario, nut 106 may be removed from mounting support fastener 120, and nut 106 may be removed from mounting support fastener 120 of FIG. 5, thereby removing mounting support 102, pressure seal 103 and clamping component 104 from outer skin 101.

Damaged pressure seal fastener 105 may then be replaced by unscrewing nut 106 from the at least partially threaded shank of damaged pressure seal fastener 105, thereby freeing damaged pressure seal fastener 105. In the event that more than one pressure seal fastener 105 is attaching clamping component 104 to mounting support 102, and thereby clamping pressure seal foot 180 between clamping component 104 and mounting support 102, damaged pressure seal fastener 105 may be replaced without detaching pressure seal 103 from between mounting support 102 and clamping component 104.

In other words, pressure seal fastener 105 may be replaced by removably detaching mounting support 102 from outer skin 101 and without detaching pressure seal foot 180 of pressure seal 103 from in between clamping component 104 and mounting support 102.

Figure 7:
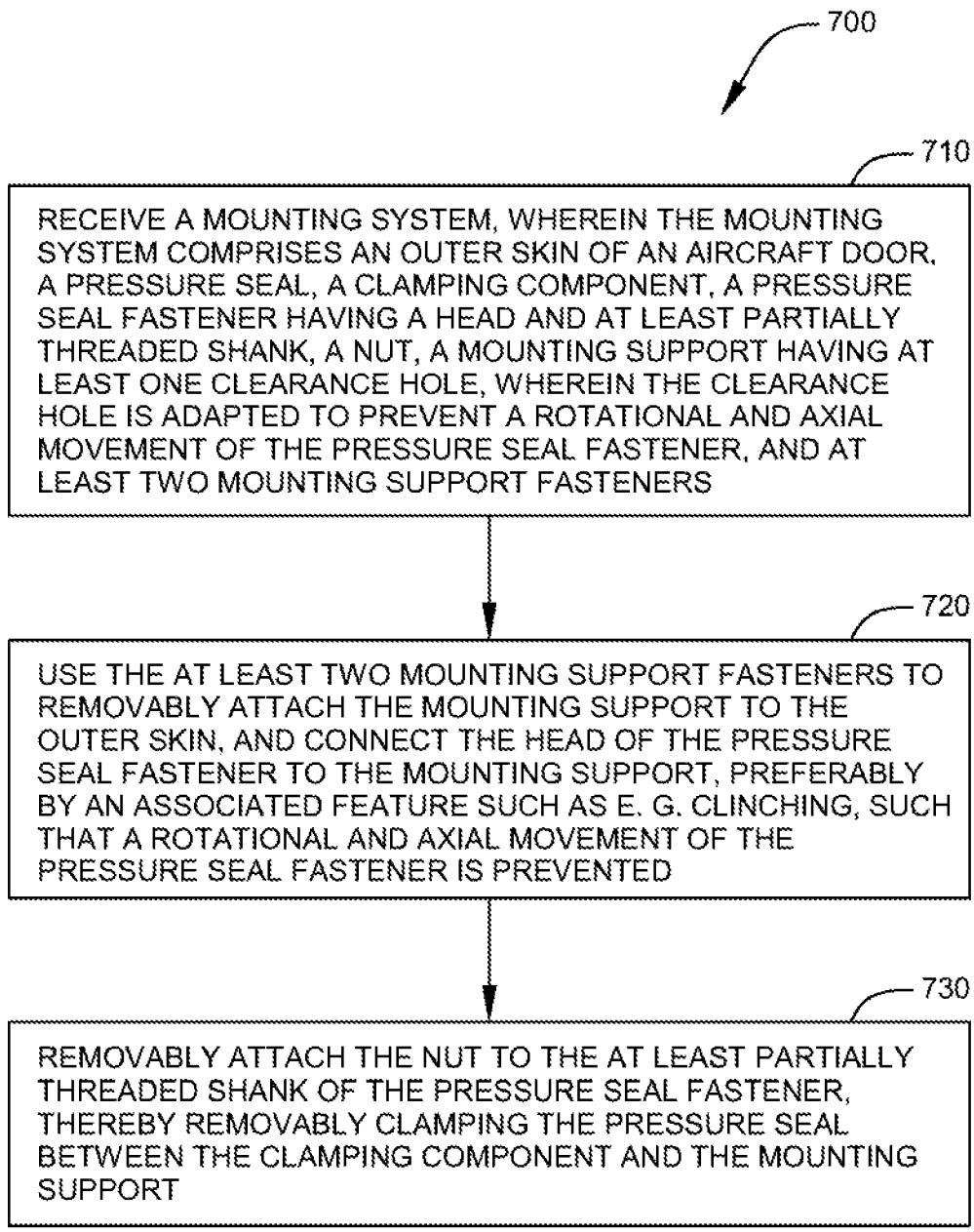
FIG. 7 is a diagram of a flow chart showing illustrative operations for using a mounting system to install a pressure seal of an aircraft door of an aircraft in accordance with some embodiments.

FIG. 7 is a flowchart showing illustrative operations for using a mounting system to install a pressure seal of an aircraft door of an aircraft in accordance with some embodiments.

Illustrative operations 710, 720, and 730 of flowchart 700 may be performed by an operator and/or an appropriate apparatus that is adapted to use a mounting system to install a pressure seal of an aircraft door.

During operation 710, the operator and/or the apparatus may receive a mounting system, wherein the mounting system comprises an outer skin of an aircraft door, a pressure seal, a clamping component, a pressure seal fastener having a head and an at least partially threaded shank, a nut, a mounting support having at least one clearance hole, wherein the clearance hole is adapted to prevent a rotational and axial movement of the pressure seal fastener, and at least two mounting support fasteners.

As an example, the operator and/or the apparatus may receive a mounting system for a pressure seal such as mounting system 107 of FIG. 2. As shown in FIG. 2, mounting system 107 may include outer skin 101 of an aircraft door, pressure seal 103, clamping component 104, pressure seal fastener 105 having a head and an at least partially threaded shank, nut 106, and mounting support 102 having at least one clearance hole such as clearance hole 160 of FIG. 3.

The clearance hole of mounting system 107 of FIG. 2 may be adapted to prevent a rotational and axial movement of pressure seal fastener 105 (e.g., using clinching against a mating surface and/or a side wall surface of the clearing hole as shown in FIG. 5). If desired, mounting system 107 may include at least two mounting support fasteners 120 that removably attach mounting support 102 to outer skin 101.

During operation 720, the operator and/or the apparatus may use the at least two mounting support fasteners to removably attach the mounting support to the outer skin. The head of the pressure seal fastener may be connected to the mounting support such that a rotational and axial movement of the pressure seal fastener is prevented. This may be realized by means of an associated feature, such as e. g. clinching.

As an example, the operator and/or the apparatus may use mounting support fastener 120 of FIG. 5 and FIG. 6 to removably attach mounting support 102 to outer skin 101 by using a respective nut 106 that is screwed onto the respective mounting support fastener. For example, the operator and/or the apparatus may insert the head of pressure seal fastener 105 inside clearance hole 160 of mounting support 102 such that the at least partially threaded shank of pressure seal fastener 105 protrudes from mounting support 102 through clearance hole 160.

In some embodiments, mounting support fastener 120 may have a sunken head. In these embodiments, mounting support fastener 120 may removably attach mounting support 102 to outer skin 101 by fastening nut 106 onto mounting support fastener 120 such that the sunken head of mounting support fastener 120 does not protrude from outer skin 101.

Thus, the head of pressure seal fastener 105 may be connected to the mounting support 102 such that a rotational and axial movement of pressure seal fastener 105 is prevented. This may be achieved by means of an associated feature, such as e. g. clinching. For example, as shown in FIG. 5, a rotational and axial movement of pressure seal fastener 105 may be prevented through mating surface 151 of clearance hole 160 and/or through side wall surface 152 of clearance hole 160.

During operation 730, the operator and/or the apparatus may removably attach the nut to the at least partially threaded shank of the pressure seal fastener, thereby removably clamping the pressure seal between the clamping component and the mounting support.

As an example, the operator and/or the apparatus may screw nut 106 onto pressure seal fastener 105 of FIG. 5, thereby removably clamping pressure seal 103 between clamping component 104 and mounting support 102.

For example, as shown in FIGS. 5 and/or 6, the operator and/or the apparatus may align a first cut-out of pressure seal foot 180 with the at least partially threaded shank of pressure seal fastener 105 and align a second and third cut-out of pressure seal foot 180 with mounting support fasteners 120.

If desired, clamping component 104 may have holes 140 and 150 and clearance hole 160. Removably attaching nut 106 to the at least partially threaded shank of pressure seal fastener 105 may include aligning clearance hole 160 with the at least partially threaded shank of pressure seal fastener 105 and aligning each of the at least two openings 150 with a respective mounting support fastener 120.

It should be noted that the above described embodiments are merely described for illustration purposes, but not in order to restrict the present invention thereto. Instead, multiple modifications and variations of the presented embodiments are possible and should, therefore, also be considered as being part of the invention.

By way of example, mounting support 102 is shown in FIGS. 2, 3, 5, and 6 with an edge protection for outer skin 101 that encompasses only a portion of the edge of outer skin 101. However, the edge protection may completely encompass the edge of outer skin 101. If desired, the edge protection may be omitted. For example, mounting support 102 may not overlap the edge of outer skin 101.

Furthermore, mounting support 102 is shown in FIG. 3 with holes 140 and 150 that have a different size. However, holes 140 and 150 may have the same size, if desired. In some embodiments, each hole of holes 150 may have different sizes, or each hole of holes 150 may have either a first or a second diameter that are different from each other, etc.

Furthermore, the rotational and axial movement prevention feature for pressure seal fastener 105 of the mounting support 102 can be realized by an additional part which may have holes 140 and 150 and clearance hole 160. This additional part may be mounted with nut 106 onto mounting support 102 and/or outer skin 101. The mounting support 102 and/or outer skin 101 may receive additional cut out (e.g. hole, pocket) to accommodate any possible protrusion of pressure seal fastener 105.

REFERENCE LIST 1 aircraft
2 aircraft airframe
3a aircraft passenger cabin
3b aircraft cargo deck
3c aircraft flight deck
4 aircraft doors
4a, 4b, 4c, 4d cabin access doors/aircraft doors
100 contour
101 outer skin
102 mounting support/edge protection
103 pressure seal
104 clamping component
105 pressure seal fastener
106 nut
107 mounting system
108 venting hole
109 edge protection
110 holes outer skin
120 mounting support fastener
121 interface surface
140 hole
150 hole
151 mating surface of clearance hole
152 side wall surface of clearance hole
160 clearance hole
170 opening for fastener
180 pressure seal foot
182 pressure seal bulb
700 flowchart
710, 720, 730 operations

What is claimed is:

1. A mounting system for a pressure seal of an aircraft door of an aircraft, comprising:
an outer skin of the aircraft door;
a pressure seal;
a clamping component;
a pressure seal fastener having a head and an at least partially threaded shank;
a nut;
a mounting support having at least one clearance hole, wherein the clearance hole is adapted to prevent a rotational and axial movement of the pressure seal fastener; wherein the head of the pressure seal fastener is connected to the mounting support such that a rotational and axial movement of the pressure seal fastener is prevented;
the nut is removably attached to the at least partially threaded shank of the pressure seal fastener, thereby removably clamping the pressure seal between the clamping component and the mounting support;
and wherein the pressure seal further comprises: a pressure seal bulb;
a pressure seal foot that is clamped between the clamping component and the mounting support and comprises:
a first cut-out for the at least partially threaded shank of the pressure seal fastener, wherein:
the mounting system comprises at least two mounting support fasteners, wherein the at least two mounting support fasteners removably attach the mounting support to the outer skin; and the pressure seal foot comprises at least second and third cut-outs for the at least two mounting support fasteners.

2. The mounting system of claim 1, wherein the mounting support has an edge protection that at least partially encompasses an edge of the outer skin.

3. The mounting system of claim 1, wherein the head of the pressure seal fastener fits inside the clearance hole of the mounting support and the at least partially threaded shank of the pressure seal fastener protrudes from the mounting support through the clearance hole.

4. The mounting system of claim 1, wherein the mounting support is at least partially made from a fiber reinforced composite material.

5. The mounting system of claim 1, wherein the clamping component further comprises:
at least two openings for the at least two mounting support fasteners, wherein a respective opening of the at least two openings provides access to a respective mounting support fastener of the at least two mounting support fasteners.

6. The mounting system of claim 5, wherein the pressure seal fastener clamps the pressure seal foot between the clamping component and the mounting support when the at least two mounting support fasteners are detached from the outer skin through the at least two openings.

7. The mounting system of claim 1, wherein the pressure seal bulb further comprises:
a venting hole that ensures that a first pressure inside the pressure seal bulb and a second pressure outside the pressure seal bulb at the opening of the venting hole are substantially the same.

8. The mounting system of claim 1, wherein each of the at least two mounting support fasteners further comprise:
a sunken head that does not protrude from the outer skin.

9. A method for using a mounting system to install a pressure seal of an aircraft door of an aircraft, comprising:
receiving the mounting system, wherein the mounting system comprises an outer skin of the aircraft door, a pressure seal, a clamping component, a pressure seal fastener having a head and an at least partially threaded shank, a nut, a mounting support having at least one clearance hole, wherein the clearance hole is adapted to prevent a rotational and axial movement of the pressure seal fastener, and at least two mounting support fasteners, wherein the pressure seal has a first cut-out and at least second and third cut-outs;
using the at least two mounting support fasteners to removably attach the mounting support to the outer skin, connecting the head of the pressure seal fastener to the mounting support such that a rotational and axial movement of the pressure seal fastener is prevented;
removably attaching the nut to the at least partially threaded shank of the pressure seal fastener, thereby removably clamping the pressure seal between the clamping component and the mounting support; aligning the first cut-out with the at least partially threaded shank of the pressure seal fastener; and aligning the at least second and third cut-outs with the at least two mounting support fasteners.

10. The method of claim 9, wherein using the at least two mounting support fasteners to removably attach the mounting support to the outer skin further comprises:

inserting the head of the pressure seal fastener inside the clearance hole of the mounting support such that the at least partially threaded shank of the pressure seal fastener protrudes from the mounting support through the clearance hole.

11. The method of claim 10, wherein each of the at least two mounting support fasteners has a sunken head, and wherein using the at least two mounting support fasteners to removably attach the mounting support to the outer skin further comprises:

fastening each of the at least two mounting support fasteners such that the sunken head of the respective mounting support fastener does not protrude from the outer skin.

12. The method of claim 9, wherein the clamping component has a clearance hole and at least two openings, and wherein removably attaching the nut to the at least partially threaded shank of the pressure seal fastener further comprises:

aligning the clearance hole with the at least partially threaded shank of the pressure seal fastener; and aligning each of the at least two openings with a respective mounting support fastener of the at least two mounting support fasteners.

\* \* \* \* \*